United States Patent [19]

Bart

[11] Patent Number: 4,723,165
[45] Date of Patent: Feb. 2, 1988

[54] AC COUPLED SYNC SEPARATOR SYSTEM WITH FILTER DC FEEDBACK

[75] Inventor: Stan Bart, Hoffman Estates, Ill.

[73] Assignee: Zenith Electronics Corporation, Glenview, Ill.

[21] Appl. No.: 935,425

[22] Filed: Nov. 26, 1986

[51] Int. Cl.$^4$ .............................................. H04N 5/06
[52] U.S. Cl. ..................... 358/153; 358/155; 328/139
[58] Field of Search ............... 358/148, 153, 154, 155, 358/156, 157, 158; 328/115, 139

[56] References Cited

U.S. PATENT DOCUMENTS

| | | | |
|---|---|---|---|
| 4,064,541 | 12/1977 | Schneider et al. | 358/153 |
| 4,117,352 | 9/1978 | Thomas et al. | 328/139 |
| 4,254,435 | 3/1981 | Dayton et al. | 358/153 |
| 4,621,289 | 11/1986 | Bart et al. | 358/155 |
| 4,635,115 | 1/1987 | Kamiya | 358/153 |

*Primary Examiner*—James J. Groody
*Assistant Examiner*—Michael D. Parker

[57] ABSTRACT

A novel method and apparatus of AC coupling composite video sync information to a sync separator circuitry with digital controlled filtered DC feedback is described. An AC coupling circuit such as a capacitor provides an intermediate signal in response to received composite video. The intermediate signal may be level adjusted and gain provided to provide a first input to a sync slicer and an input to a sync filter. The output of the sync filter may provide a second input to the sync slicer circuit which responsively varies the reference level for the sync slicer in repsonse to variations in the level of the received composite video. DC feedback from the filter to the AC coupling circuit provides for a stabilization in the intermediate signal and in the filter output signal. These two signals ultimately provide the input to the sync slicer so that the composite sync is provided in response to all sync signals in spite of level variations in the sync tips in the received composite video signal.

9 Claims, 3 Drawing Figures

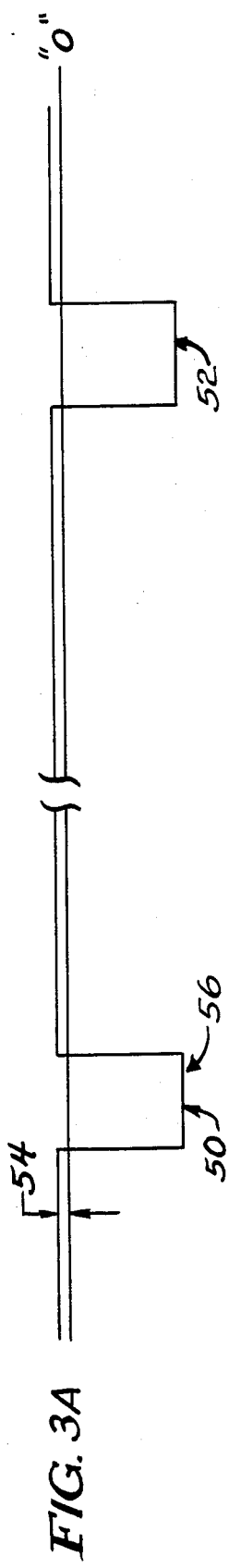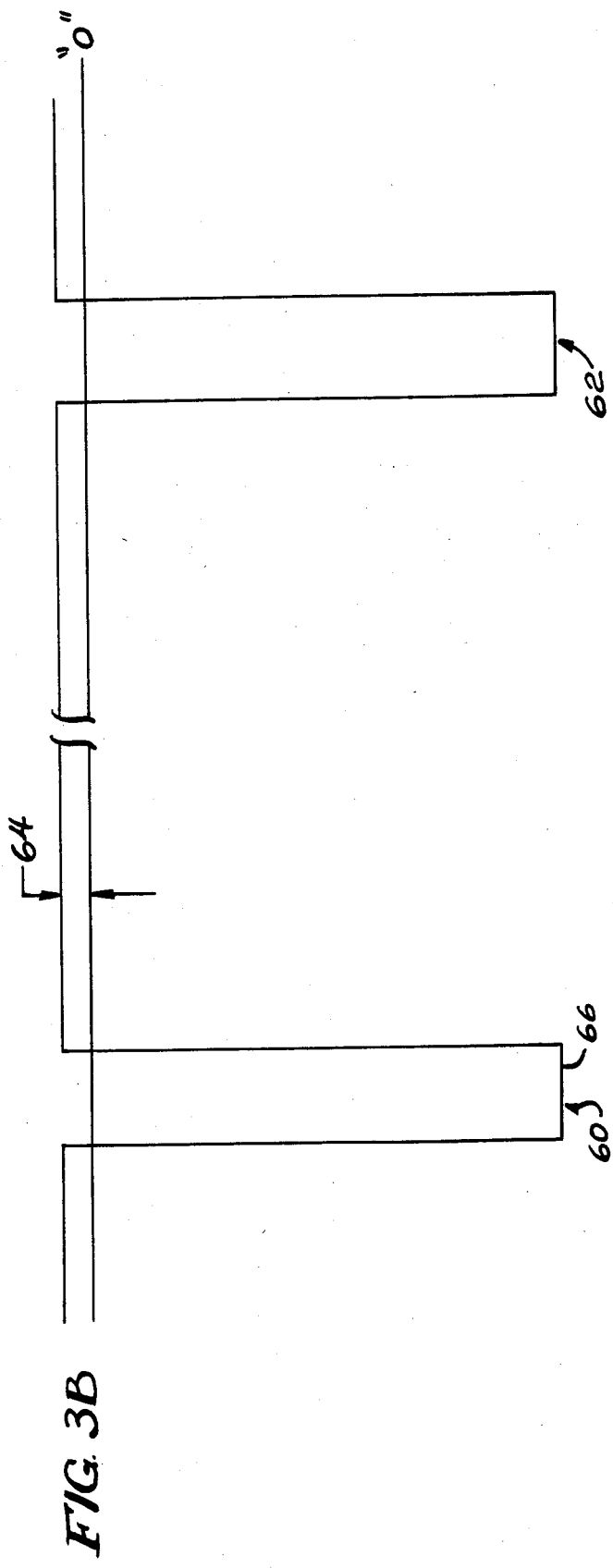

AC COUPLED SYNC SEPARATOR SYSTEM WITH FILTER DC FEEDBACK

BACKGROUND OF THE INVENTION

The present invention generally concerns the television art and the processing of synchronizing signals within the television receiver. More particularly, the present invention concerns the separation of such signals from the transmitted composite video signal under varying signal conditions, including a varying DC sync level in the composite video signal.

Various systems have been utilized previously for separation of sync signals from composite video signals. At least one such system is described in detail in U.S. Pat. No. 4,621,289, issued Nov. 4, 1986 for an invention entitled Digital Sync Separator And Differentiator. In that system, the sync signals are separated from the composite video signal by comparing the video signal to a DC reference voltage which is generated depending upon the particular characteristics of the received video signal. As such, that system provides a recognizable advance in the art with particular application to digital sync applications in which composite sync may be separated from the composite video despite noisy, weak, or nonstandard signal conditions. However, as recognized by the description of the system in that patent, that system is responsive to the DC level detection. Accordingly, signal recognition difficulties may arise in the presence of swings in the input DC level of the composite video signal, particularly rapid and dramatic DC swings in the sync tip levels. This can result in a nonrecognition of the sync signal or, equally bad, a false recognition of video signals as synchronizing signals.

Accordingly, it is a principal object of the present invention to provide an improved sync separator system which generally overcomes the deficiencies present in the prior art.

It is a further object of the present invention to provide an improved sync separator system which may provide the advantages of sync separation based upon input signal characteristics while reducing the overall sensitivity to variations within the input signal.

It is still a further object of the present invention to provide an AC coupled sync separator system having filtered DC feedback means for providing stabilized sync separation based upon input signal characteristics without an undue sensitivity to input DC level changes.

BRIEF DESCRIPTION OF THE FIGURES

The features of the present invention which are believed to be novel are set forth with particularity in the appended claims. Additional and further objects of the present invention may become apparent from the following description. The invention, together with its objects and advantages thereof, accordingly may be best understood by reference to the following description taken in conjunction with the accompanying drawings in which like reference numerals identify like elements and in which:

FIG. 3 is an illustration of several waveforms of signals representing inputs of differing video content (waveform A—pure black; waveform B—pure white) which further illustrate the features of the present invention.

DETAILED DESCRIPTION OF THE PREFERRED EMBODIMENT

Systems such as the digital sync separator and differentiator disclosed and described in U.S. Pat. No. 4,621,289, the teachings of which are incorporated herein by reference, may use a sync separator system to generate a DC reference in response to received, input composite video signals. That reference voltage acts by means of a sync slicing circuit to chop all of the composite video signal below (in negative sync systems) the DC reference level. When chosen at about 10%–20% of the expected peak value of the composite video signal, the composite sync may be provided at an output. The reference signal will be between the porch level and sync tip level which theoretically contains solely sync information. As explained therein, the reference signal will vary with the input signal.

The system of U.S. Pat. No. 4,621,289 accordingly will be sensitive to the DC level variations. In operation, the input signal in such a system desirably is maintained at about a desired DC sync tip level, e.g. 7 volts. This desired level, in conjunction with associated charge and discharge control circuitry, charges a sync filter circuit (typically a capacitor) to provide the DC reference level. The sync filter acts as a sort of peak average detector. Fluctuations in the sync tip level, however, may cause nonrecognition or false recognition of sync information.

Accordingly, the present invention in a preferred embodiment provides apparatus and technique for separating the sync information from composite video signals by AC coupling the composite video signal to a level adjustment circuit. The level adjustment circuit may provide a "O" carrier level to the signal as passed by the original AC coupling. Desired gain may also be introduced at this stage. The output of the level adjustment circuit is split into two lines. One line provides a first input to a sync slicing circuit. The second line goes to a sync filter which generates a DC reference level as a second input to the sync slicing circuit. The sync slicing circuit then provides separated composite sync as system output. The signal from the sync filter also is fed back to the output of the AC coupling stage to provide desired system stability.

Figure 1:
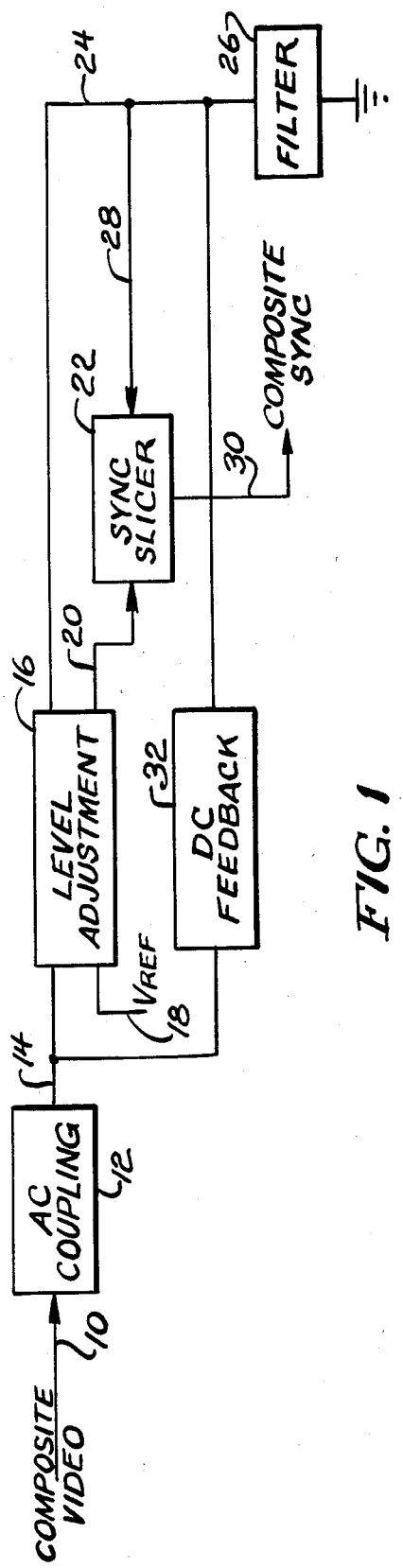
FIG. 1 is a general block diagram representation of a sync separator system in accordance with the teachings of the present invention.

The circuitry of FIG. 1 provides an AC coupled sync separator system having filtered DC feedback that generally overcomes the deficiencies of the prior art in accordance with the teachings of the present invention. More particularly, a composite video signal is received on an input line 10 by an AC coupling circuit 12. The AC coupling circuit 12 provides an intermediate signal on a line 14 to a level adjustment circuit 16. The level adjustment circuit 16 further receives a voltage reference signal via a line 18 to provide desired level adjustment, such as "O" carrier. For example, the "O" DC level may be set at ground or at a desired DC level such as 3 volts. Any desired gain may be introduced by the circuit 16. The output of the level adjustment circuit 16 is then split and provided via a first line 20 as a first input to a sync slicer circuit 22 such as that described in U.S. Pat. No. 4,621,289. The second output of the level adjustment circuit 16 connects via a line 24 to a filter 26.

The output of the filter 26 is provided via a line 28 as a second input to the sync slicer 22. A composite sync output signal may then be generated by the sync slicer 22 on an output line 30. The output of the filter 26 is also provided via a DC feedback circuit 32 to the line 14 to provide feedback for input to the level adjustment circuit 16.

Figure 2:
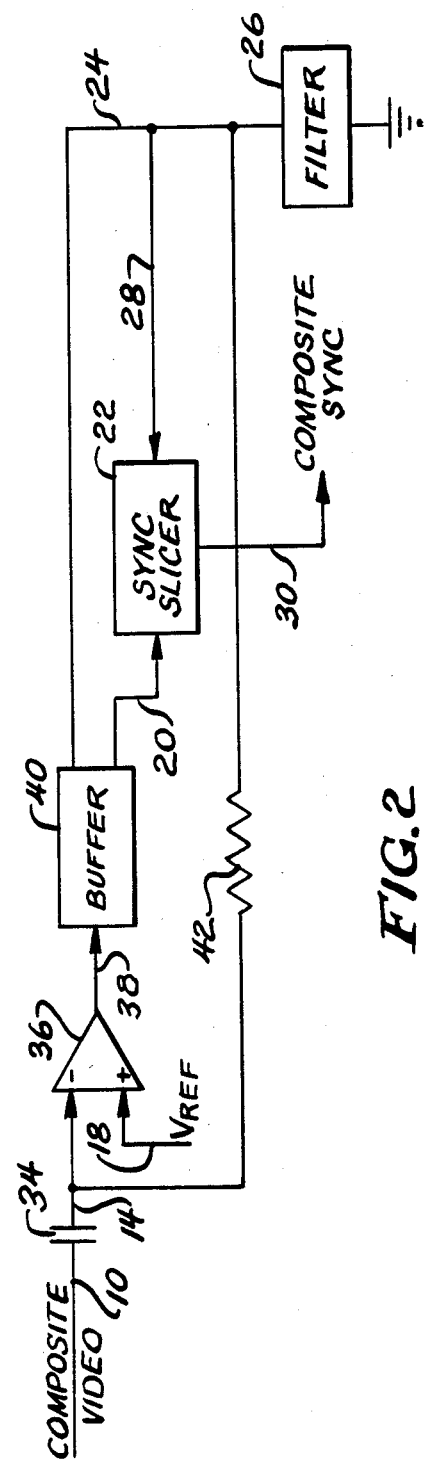
FIG. 2 is a more particularized block diagram representation, including particular circuit elements, of a sync separator system in accordance with the teachings of the present invention.

A more detailed embodiment of a preferred system according to the present invention is illustrated in FIG. 2. Therein, a capacitor 34 acts as an AC coupling circuit to receive the composite video signal from an input line 10. The output from the capacitor 34 on a line 14 connects to one input of a comparator 36. The second input of the comparator 36 is a reference voltage on a line 18. The output of the comparator (with any desired gain) on a line 38 connects to a buffer 40 which supplies an output on a first line 20 as one input to the sync slicer circuit 22. The buffer 40 also supplies that output from line 38 as a signal on a second line 24 to a filter 26, which provides a second input to sync slicer 22. The sync slicer circuit 22 then provides a composite sync output signal on the output line 30. DC feedback of the filter output 26 is provided by a resistor 42 to the line 14.

The operation of FIGS. 1 and 2 may be viewed as being substantially similar, with FIG. 2 being a preferred embodiment of the system of FIG. 1. Accordingly, the operation of a system will be discussed in terms of the preferred, detailed schematic of FIG. 2. As mentioned previously, the AC coupling capacitor 34 provides an intermediate signal on a line 14 in response to a composite video signal received at the input line 10. The capacitor 34 acts to provide a DC level average at the line 14. This is illustrated in the waveforms of FIG. 3. Therein, waveform A represents a signal on the line 14 in response to a pure black input video signal, i.e. one with no color or video information. In a negative sync system, the DC average will drop and provide pulses 50 and 52 in response to sync signals in the composite video signal. A slight DC offset 54 as shown may be attributed to the front and back porch level in the composite video signal. In the system illustrated by the waveform A of FIG. 3, pulses 50 and 52 endure for approximately four microseconds with a sixty microsecond interval between them. In a system utilizing one volt peak-to-peak standards, the porch level offset 54 will be approximately 15.625 millivolts. A sync tip 56 of the pulse 50 then will be approximately 250 millivolts below the porch offset which will provide a swing below the reference level "O" of approximately 234.375 millivolts.

Waveform B of FIG. 3 illustrates the opposite signal extreme for the input composite video, namely pure white video. Again, pulses 60 and 62 will be recognized as sync pulses having a duration of approximately four microseconds and a sixty microsecond interval between the conclusion of the pulse 60 and initiation of the pulse 62. The DC offset 64 attributed to the front and back porches will have grown to approximately 62.5 millivolts. Again, a one volt peak-to-peak system will provide a sync tip 66 for the sync pulse 60 at approximately 1,000 millivolts below the DC offset porch level represented by the offset 64. This provides a sync drop of approximately 937.5 millivolts below the DC reference level "O".

It will be recognized that waveforms A and B represent the two extreme of the possible signals expected to be received within the system, i.e.. pure black and pure white signals, or zero video and maximum video. Accordingly, the signal swing illustrated by the difference between waveform A and waveform B represents the type of signal swing which the system must be able to accommodate in order to operate effectively under the worst case situation which may be expected. It is desired that the sync slicer 22 typically slice off signals 20% below the sync tip so as to be able to recognize sync signals which may have a slight variation in their sync tip level. (These type of variations are those which may occur in the prior art and as such may make the prior art system undesirable and cause nonrecognition of sync in some instances. The sync slicing level will be recognized, however, as a matter of design choice.) It is also desirable, as illustrated by waveform A, that the system operate on 25% sync level, i.e., 250 millivolts out of a possible one volt peak to peak. Wherefore, the slice point must be set at approximately fifty millivolts below. However, due to the expected variations of approximately 750 millivolts a very large change may be expected at the inputs to the sync slicer 22. As will be recognized by those skilled in the art, it may be desirable to minimize the variation in the swings in the voltage levels and the inputs to the sync slicer 22. The following table illustrates expected ranges of changes in the input signal and the signal on the line 28 at the output of the filter 26 as a second input to the sync slicer 22 with varying gain provided in the level adjustment circuit 16 and with no feedback provided, i.e., DC feedback circuit 32 or feedback resistor 42 are omitted from the system.

TABLE 1

| | (no feedback) | |
|---|---|---|
| Input Change | Filter Output Change | Gain |
| −703 mv | 11,250 mv | 16 |
| −703 mv | 5,625 mv | 8 |
| −703 mv | 2,812 mv | 4 |
| −703 mv | 1,406 mv | 2 |
| −703 mv | 703 mv | 0 |

It should be noted that the negative 703 millivolt swing in the input signal shown in the left hand column of Table 1 represents the expected swing between minimum video level and maximum video level as shown by waveforms A and B of FIG. 3. Even in the best case illustrated by zero gain, a 703 millivolt swing must be compensated for at the sync slicer 22 from the line 28 as an output of the filter 26.

Table 2 below illustrates the expected voltage variations at the same points illustrated by Table 1, except that feedback is now provided:

TABLE 2

| | (with feedback) | |
|---|---|---|
| Input Change | Filter Output Change | Gain |
| −351 mv | 351 mv | 2 |
| −175 mv | 175 mv | 4 |
| −87 mv | 87 mv | 8 |
| −43 mv | 43 mv | 16 |
| −21 mv | 21 mv | 32 |

Thus, as illustrated providing a gain of 32 stabilized both the input on a line 14 to the comparator 36 and the input on the line 28 to the sync slicer 22, even as the system continues to change between pure black and pure white signals. In this fashion, the system may accommodate wide fluctuations in the composite video input signal on the line 10 and still provide for assured recognition of the sync signals by stabilizing the placement of the sync tips. The system has proven much more reliable than attempting to DC stabilize the sync tips prior to the sync separation operation to accommodate the peak average detection of the sync filter 26.

The voltage reference on a line 18 to the level adjustment circuit 16 or the comparator 36 provides for the desired DC zero level. If it is desired that the system operate at 3 volts, the zero line illustraded in waveform A and waveform B of FIG. 3 would be 3 volts rather than 0 volts. Zero volts may be provided by grounding the voltage reference on the line 18.

The operation of the filter circuit 26 to provide the DC reference signal as a second input to the sync slicer 22 is described in detail in U.S. Pat. No. 4,621,289. In the present system, the filter circuit operates somewhat as a peak average detector to provide the reference DC level as a function of sync tip level and sync pulse duty time. In practice, the filter 26 typically may comprise a capacitor.

Although the filtered DC feedback illustrated in FIG. 2 comprises a resistor 42, it is envisioned that an appropriate diode value may work equally well.

The above described system has worked effectively to a 25% sync level with video at negative 6 to negative 10 dB. In the same system it may be desirable to maintain a gain of approximately 16 to minimize the signal variation as illustrated in Table 2 with the filtered DC feedback and AC coupling illustrated in FIGS. 1 and 2.

It will be appreciated that the present invention is designed to be used with other circuits in the operation of television set or otherwise. Such interconnections as would be necessary or otherwise have been referred to herein would be apparent to one skilled in the art and familiar with the teachings of this application, and hence have not been discussed or shown in detail in the drawings. Similarly, although some elements have been illustrated in purely block diagram form, the teachings of preferred embodiments for this circuit elements may be found in U.S. Pat. No. 4,621,289 or would otherwise be apparent to one skilled in the art and familiar with the teachings of the present application.

Although the present invention has been described in terms of the illustrated preferred embodiment, the exact scope of the invention is set forth with particularity in the appended claims. Thus, it may be appreciated that changes may be made in the implementing circuitry without escaping the scope and spirit of the invention as described herein.

What is claimed is:

1. Apparatus for separating sync information from video information in received composite video signals containing video and sync information comprising:
   AC coupling means for providing an intermediate signal in response to said composite video signals;
   level adjustment means coupled to said AC coupling means for level adjusting said intermediate signals;
   filter means for providing a reference signal in response to said intermediate signal;
   sync slicer means for subtracting said reference signal from said intermediate signal to provide separated sync information;
   DC feedback means coupled to provide feedback information from said filter means to said AC coupling means.

2. The apparatus of claim 1 wherein said level adjustment means comprise comparator means receiving said intermediate signal at one input and a desired level reference signal at a second input.

3. Apparatus of claim 1 wherein said AC coupling means comprises a capacitor.

4. The apparatus of claim 3 wherein said DC feedback means comprises a resistor.

5. The apparatus of claim 1 wherein said level adjustment means further comprises amplifier means for providing desired gain to said intermediate signal.

6. Apparatus for separating sync information from video information in received composite video signals containing video and sync information comprising:
   capacitor means for providing an intermediate signals in response to said received composite video signals;
   comparator means coupled to said capacitor means for level adjusting said intermediate signal;
   filter means for providing a reference signal in response to said intermediate signal;
   sync slicer means for subtracting said reference signal from said intermediate signal to provide separated sync information; and
   DC feedback means coupled to provide feedback information from said filter means to said capacitor.

7. The apparatus of claim 6 wherein said DC feedback means comprises a resistor.

8. The apparatus of claim 5 wherein said comparator means further provides desired gain to said intermediate signal.

9. A method for separating sync information from video information in received composite video signals containing both video and sync information comprising:
   AC coupling said received composite video signals to provide intermediate signals;
   level adjusting and amplifying said intermediate signals;
   filtering said level adjusted and amplified intermediate signals to provide a DC reference signal;
   separating said intermediate signals above said DC reference signal to provide separated sync information; and
   feeding back said DC reference signal for combination with said intermediate signal.

* * * * *